United States Patent
Shi et al.

(10) Patent No.: US 7,800,891 B2
(45) Date of Patent: Sep. 21, 2010

(54) COVER LOCKING STRUCTURE FOR PORTABLE ELECTRONIC DEVICES

(75) Inventors: Zheng Shi, Shenzhen (CN); Chih-Chiang Chang, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 105 days.

(21) Appl. No.: 12/347,172

(22) Filed: Dec. 31, 2008

(65) Prior Publication Data

US 2009/0262488 A1 Oct. 22, 2009

(30) Foreign Application Priority Data

Apr. 22, 2008 (CN) .......................... 2008 1 0301235

(51) Int. Cl.
G06F 1/16 (2006.01)
(52) U.S. Cl. .................. 361/679.01; 455/90.3; 429/97; 280/728.2; 292/226
(58) Field of Classification Search ................ 132/294, 132/293; 455/575.1, 575.5, 90.3; 429/96, 429/97; 361/679.01, 679.31, 679.02, 679.37, 361/679.08, 679.59, 679.23, 679.09, 679.41, 361/679.32; 280/854, 728.2, 731, 806; 292/80, 292/226
See application file for complete search history.

(56) References Cited

U.S. PATENT DOCUMENTS

| | | | | |
|---|---|---|---|---|
| 7,647,079 B2 * | 1/2010 | Zuo et al. | ................ | 455/575.1 |
| 2006/0196524 A1 * | 9/2006 | Yuhara | ..................... | 132/294 |
| 2009/0168311 A1 * | 7/2009 | Hung | ................... | 361/679.01 |
| 2010/0062323 A1 * | 3/2010 | Dong et al. | .................. | 429/96 |
| 2010/0130268 A1 * | 5/2010 | Huang et al. | ............. | 455/575.1 |

* cited by examiner

Primary Examiner—Hung V Duong
(74) Attorney, Agent, or Firm—D. Austin Bonderer

(57) ABSTRACT

A cover locking structure (100) for portable electronic device includes a housing (20), a releasable member (30) and a cover (10). The housing includes an end wall (22) and an extending wall (26). The end wall defines an opening (222) defined therein. One end of the extending wall connects with the end wall. The extending wall has a locking hole (2642) defined therein. The releasable member is flexibly fixed on the housing and has a block (3242) formed thereon. The block corresponds to the locking hole of the extending wall. The cover has a hook (14) formed thereon. The hook is locked in the locking hole when the cover is assembled to the housing. The block of the releasable member pushes the hook out off the locking hole when the cover is to be detached from the housing.

14 Claims, 5 Drawing Sheets

COVER LOCKING STRUCTURE FOR PORTABLE ELECTRONIC DEVICES

BACKGROUND

1. Technical Field

The present invention relates to cover locking structures, particularly, to a cover locking structure for portable electronic devices.

2. Description of Related Art

Detachable covers, such as battery covers, camera covers etc, are widely used in portable electronic devices. A cover locking structure is applied to connect the cover with a housing of the portable electronic device. Although the cover locking structure may be simple, the engagement between the cover and the housing of the portable electronic device is too firm to detach. In addition, the cover locking structure may wear down after repeated usage.

Therefore, there is space for improvement within the art.

BRIEF DESCRIPTION OF THE DRAWINGS

Many aspects of a cover locking structure can be better understood with reference to the following drawings. The components in the drawings are not necessarily drawn to scale, the emphasis instead being placed upon clearly illustrating the principles of the present cover locking structure, in which.

DETAILED DESCRIPTION OF THE EMBODIMENTS

The present cover locking structure is suitable for portable electronic devices, such as digital cameras, MP3 players, video cameras, mobile phones, PDAs, and the like, but could find other applications in which a similar cover locking structure is employed.

Figure 1:
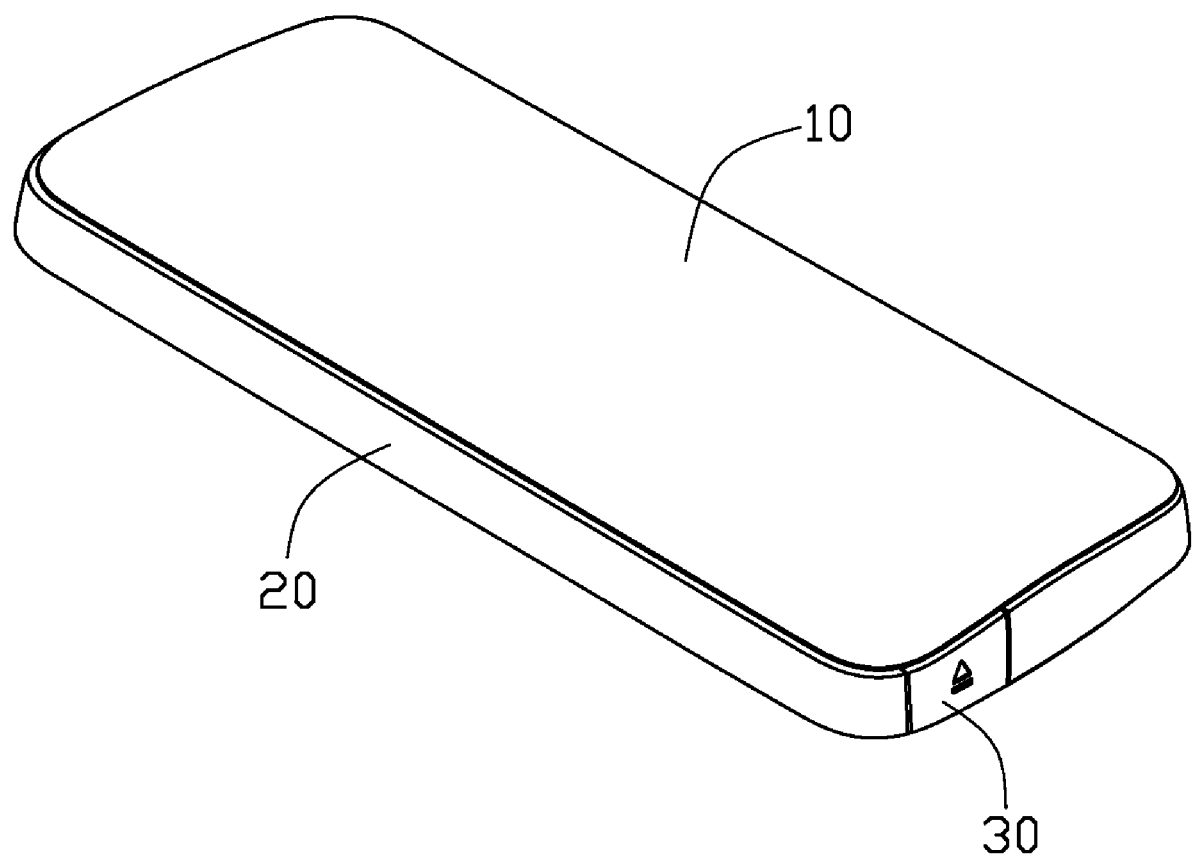
FIG. 1 is an isometric, assembled view of a cover locking structure for portable electronic devices, in accordance with an exemplary embodiment.

Referring to FIG. 1, a cover locking structure 100 may include a cover 10, a housing 20 and a releasable member 30. The releasable member 30 is used to detach the cover 10 from the housing 20.

Figure 2:
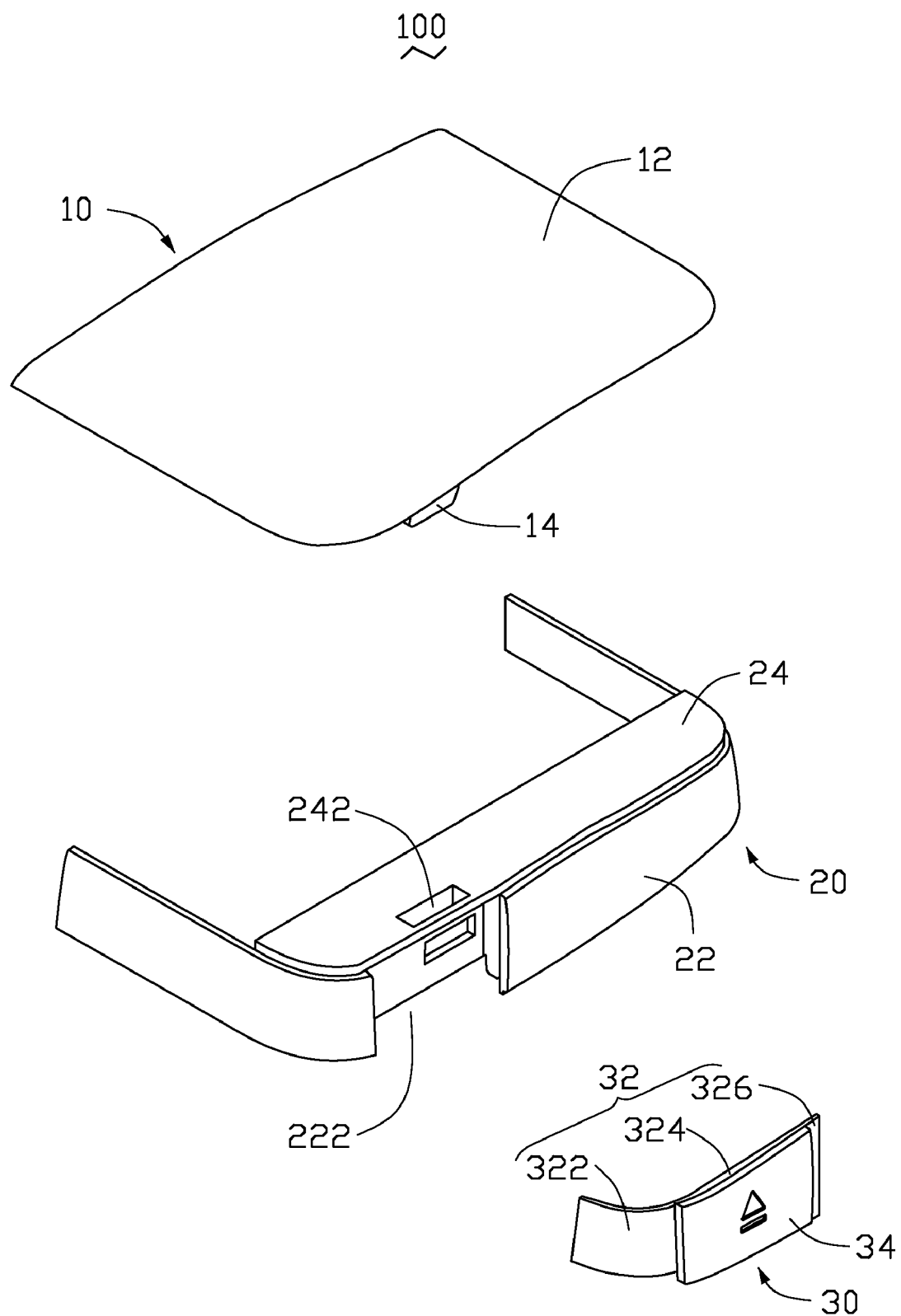
FIG. 2 is a partial, exploded, isometric view of the cover locking structure shown in FIG. 1.
Figure 3:
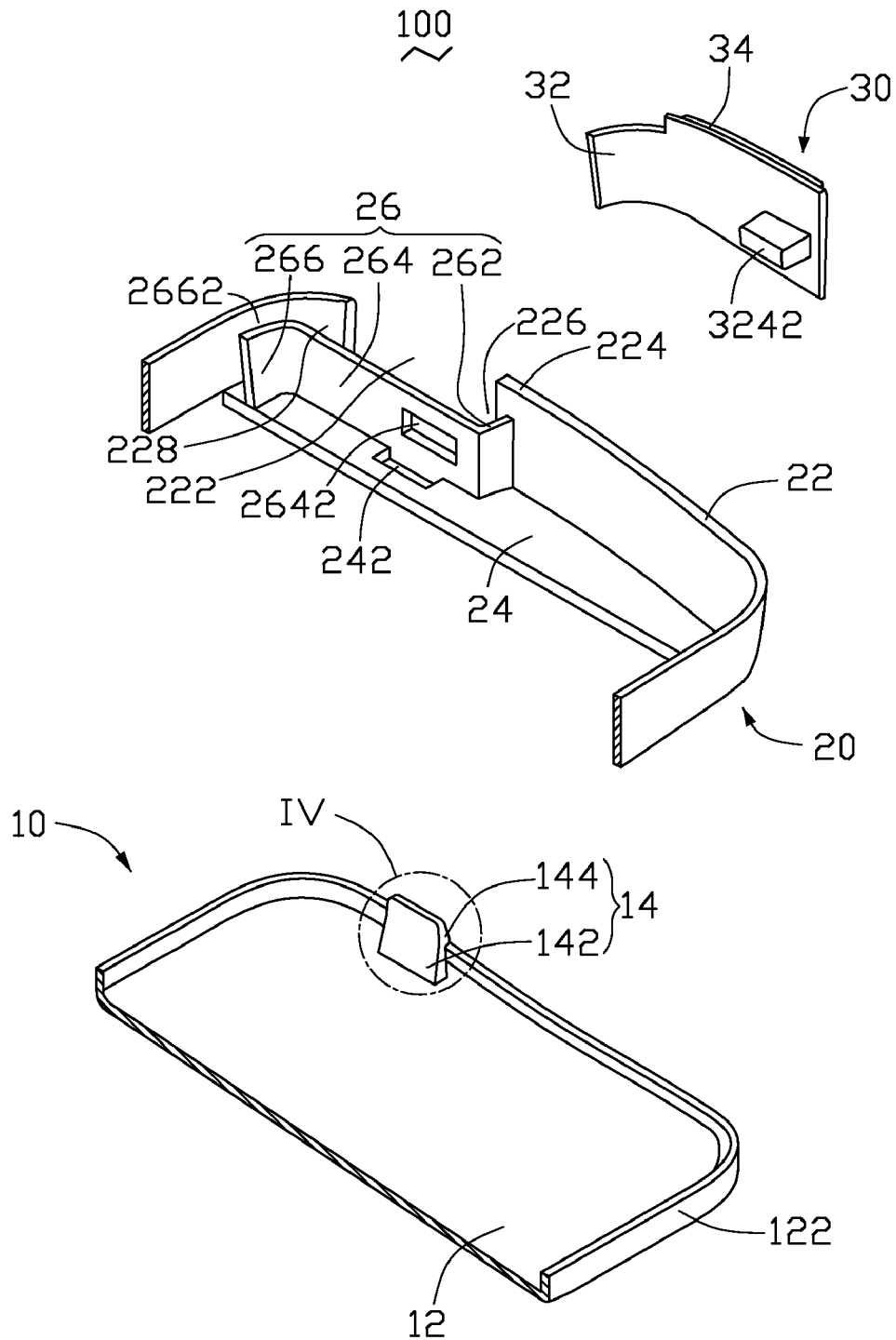
FIG. 3 is similar to FIG. 2, but viewed from another aspect.
Figure 4:
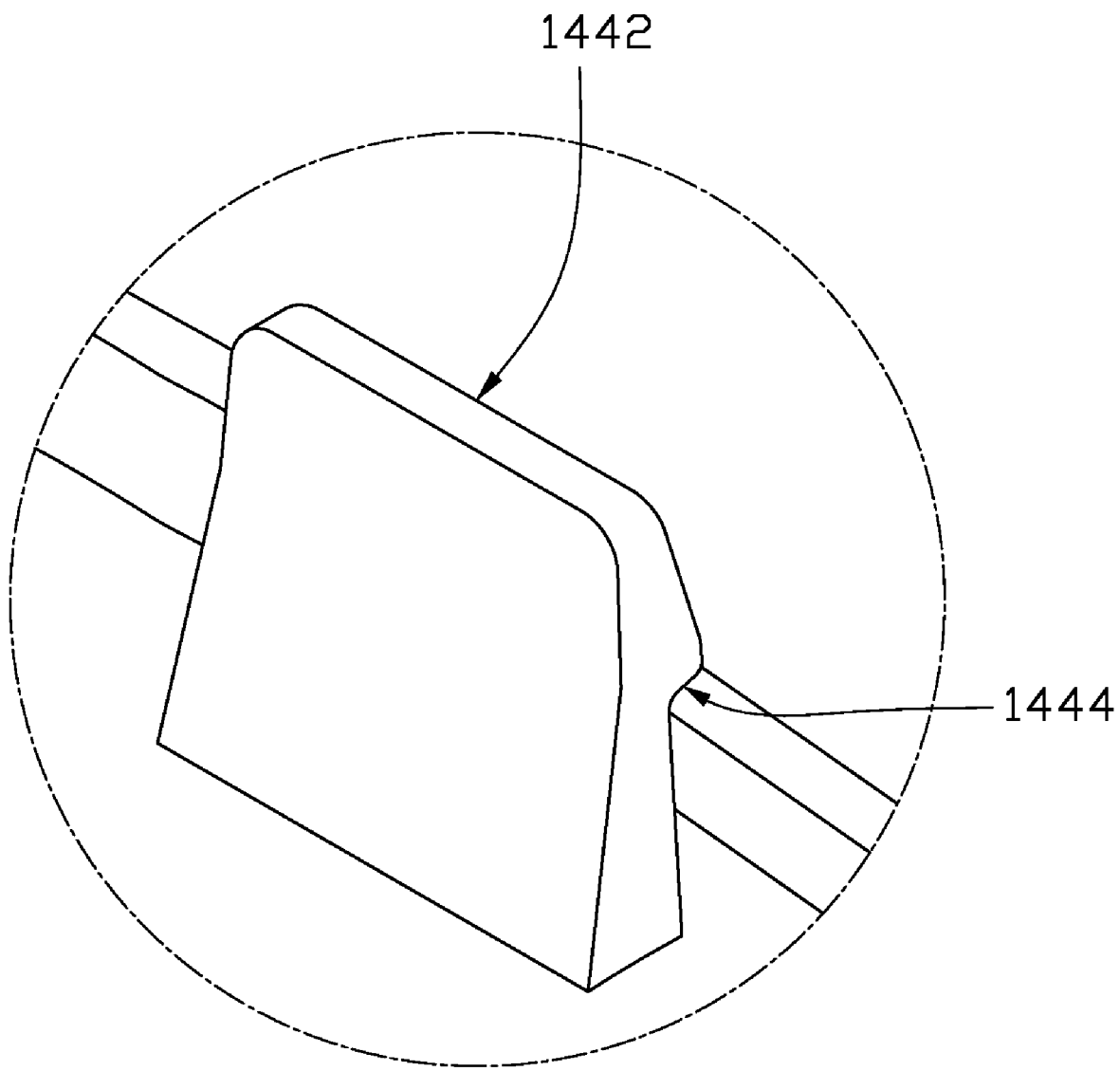
FIG. 4 is an enlarged view of a circled portion IV of FIG. 3.

Referring to FIGS. 2 and 3, the cover 10 can include a main body 12 and a hook 14 positioned at one end of the main body 12. The main body 12 may have a continuous flange 122 formed along an edge thereof. The hook 14 is flexible, and includes a hook body 142 and an arm 144. The hook body 142 vertically extends from the main body 12. Also referring to FIG. 4, the arm 144 has a slanted surface 1442 and a horizontal surface 1444.

The housing 20 includes an end wall 22, a planar portion 24 and an extending wall 26. The end wall 22 is positioned at one end of the planar portion 24, and defines an opening 222. The opening 222 is located adjacent to a corner of the housing 20, and divides the end wall 22 into a longer portion 224 and a shorter portion 228. The planar portion 24 defines an aperture 242 and positioned near the extending wall 26. Hook 14 can pass through the aperture 242

The extending wall 26 includes a connecting portion 262, a straight portion 264 and a curved portion 266. The straight portion 264 connects the connecting portion 262 and the curved portion 266. The connecting portion 262 is perpendicular to the straight portion 264, and joins with the longer portion 224. The joint of the connecting portion 262 and the longer portion 224 is near the opening 222, and a first space 226 is defined between the longer portion 224 and the straight portion 264. The straight portion 264 of the extending wall 26 defines a locking hole 2642, corresponding to the aperture 242 of the planar portion 24. The locking hole 2642 is configured for receiving the arm 144 of the hook 14. The straight portion 264 is generally parallel to the end wall 22. A second space 2662 is defined between the curved portion 266 and the shorter portion 228 of the end wall 22.

The releasable member 30 includes an inner layer 32 and an outer layer 34 formed on one side of the inner layer 32. The outer layer 34 has a shape and size corresponding to that of the opening 222. The width of inner layer 32 equals the width of the outer layer 34. A length of the inner layer 32 is longer than the length of the outer layer 34. The inner layer 32 includes a flexible portion 322, a pressing portion 324 and a fixing portion 326, in which the pressing portion 324 coincides with the outer layer 34. The flexible portion 322 is configured to be received in the second space 2662. The fixing portion 326 is configured to be received in the first space 226.

Figure 5:
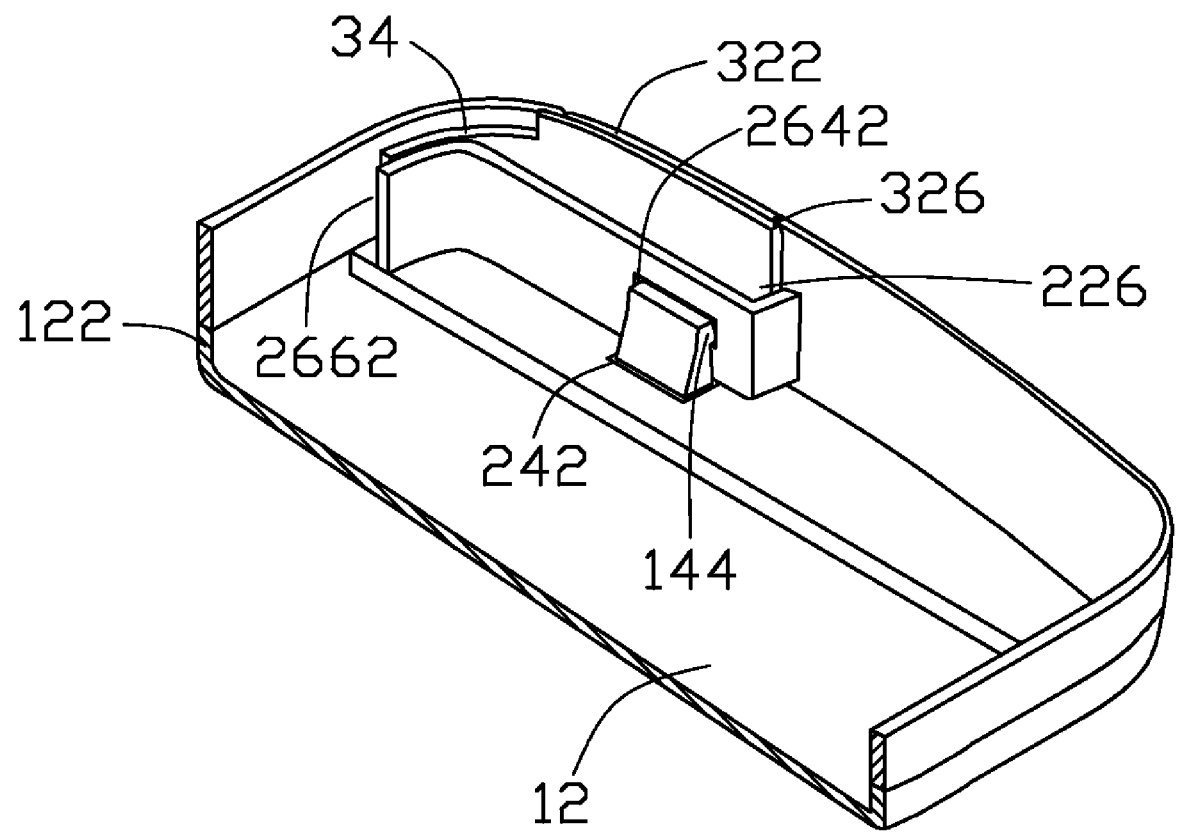
FIG. 5 is a partial, isometric, assembled view of the cover locking structure shown in FIG. 1.

Referring to FIG. 5, the flexible portion 322 is inserted into the second space 2662 between the curved portion 266 of the extending wall 26 and the shorter portion 228 of the end wall 22. The fixing portion 326 is received in the first space 226. The outer layer 34 is matingly engaged to the opening 222 of the end wall 22, and the block 3242 is inserted into the locking hole 2642 of the extending wall 26. The shorter portion 228 and the longer portion 224 can respectively prevent the flexible portion 322 and the fixing portion 326 from detaching from the housing 20. When the outer layer 34 is pressed, the block 3242 is pushed into the locking hole 2642, and the flexible portion 322 bends toward the extending wall 26. When the pressure on the outer layer 34 is released, due to the flexible portion 322 rebounding to its original shape, the outer layer 34 returns to its original position.

During assembly of the cover 10 to the housing 20, the hook 14 is pushed into the aperture 242 of the planar portion 24, and the arm 144 of the hook 14 passes the aperture 242 and engages in the locking hole 2642. Thus the cover 10 is locked on the housing 20. The slanted surface 1442 of the arm 144 can help the arm 144 easily pass the aperture 242, and the horizontal surface 1444 makes the arm 144 stably locked in the locking hole 2642.

During disassembly of the cover 10 from the housing 20, the outer layer 34 is pressed toward the straight portion 264 of the extending wall 26, and the block 3242 is pushed into the locking hole 2642. The block 3242 pushes the arm 144 of the hook 14 out off the locking hole 2642. The cover 10 then is moved away from the housing 20. When the pressure on the outer layer 34 is released, the releasable member 30 returns to its original position by rebounding of the flexible portion 322.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover locking structure for a portable electronic device comprising:
   a housing including an end wall and an extending wall, the end wall having an opening defined therein, one end of the extending wall connecting with the end wall, the extending wall defining a locking hole;
   a releasable member flexibly fixed on the housing, the releasable member having a block formed thereon, the block corresponding to the locking hole of the extending wall; and
   a cover having a hook formed thereon, the hook being locked in the locking hole when the cover is assembled to the housing, the hook being pushed away from the locking hole by the block of the releasable member when the cover is to be detached from the housing.

2. The cover locking structure as claimed in claim 1, wherein the extending wall comprises a connecting portion, a straight portion and a curved portion, the straight portion connects the connecting portion and the curved portion, the connection joins with the end wall, and the locking hole is defined in the straight portion.

3. The cover locking structure as claimed in claim 2, wherein the end wall is divided by an opening into a shorter portion and a longer portion, the connecting portion joined with the longer portion.

4. The cover locking structure as claimed in claim 3, wherein the releasable member comprises an inner layer and an outer layer formed on the inner layer, and the outer layer configured for matching the opening of the end wall.

5. The cover locking structure as claimed in claim 4, wherein the inner layer comprises a fixing portion, the extending wall comprises a straight portion, the fixing portion is received between the longer portion and the straight portion of the extending wall.

6. The cover locking structure as claimed in claim 4, wherein the inner layer comprises a flexible portion, the extending wall comprises a curved portion, and the flexible portion is received between the shorter portion of the end wall and the curved portion of the extending wall.

7. The cover locking structure as claimed in claim 4, wherein the inner layer comprises a pressing portion, the pressing portion coincides with the outer layer, and the block is formed on the pressing portion.

8. The cover locking structure as claimed in claim 1, wherein the housing further comprises a planar portion, the end wall is positioned at one end of the planar portion, the planar portion defining an aperture, and the aperture allows the hook to pass through.

9. The cover locking structure as claimed in claim 1, wherein the hook comprises a hook body and an arm at one end of the hook body.

10. The cover locking structure as claimed in claim 9, wherein the arm of the hook comprises a slanted surface and a horizontal surface connecting with the slanted surface.

11. A cover locking structure for a portable electronic device comprising:
    a housing having an opening and defining a locking hole;
    a releasable member flexibly fixed on the housing, the releasable member having a block formed thereon, the block corresponding to the locking hole; and
    a cover having a hook formed thereon, the hook being locked in the locking hole when the cover is assembled to the housing, the hook being pushed away from the locking hole by the block of the releasable member when the cover is to be detached from the housing.

12. The cover locking structure as claimed in claim 11, wherein the housing further comprises a planar portion, the planar portion defining an aperture, and the aperture allowing the hook to pass through.

13. A cover locking structure for a portable electronic device comprising:
    a housing having an opening and a walls defining a locking hole;
    a releasable member flexibly fixed on the housing; and
    a cover having a hook formed thereon, the hook being locked in the locking hole when the cover is assembled to the housing, the hook being pushed away from the locking hole by the releasable member when the cover to be detached from the housing.

14. The cover locking structure as claimed in claim 13, wherein the housing further comprises a planar portion, the planar portion defining an aperture, and the aperture allows the hook to pass through.

* * * * *